Patented Mar. 5, 1935

UNITED STATES PATENT OFFICE 1,993,271

DENATURANT FOR ALCOHOL AND METHOD OF PREPARING THE SAME

Per K. Frolich and Floyd Laverne Miller, Elizabeth, N. J., assignors to Standard Oil Development Company No Drawing. Application August 3, 1931, Serial No. 554,938

14 Claims. (Cl. 202—77)

This invention relates to a new improved odorant material particularly adapted to be used as a denaturant for potable alcohols and more especially to an organic liquid product containing organically combined sulfur and to methods of producing such products, especially by the limited oxidation of liquid organic material containing combined sulfur such as the distillates and products of hydrolysis obtainable from spent acid or caustic solutions used in treating petroleum oils and the like.

It is known that oily materials containing combined sulfur and produced by steam distillation or like methods from spent acids used in treating petroleum oils are suitable denaturants for ethyl alcohol and such have indeed been adopted as standard denaturants by the U. S. Government under the name of "alcotate". While alcotate is a satisfactory denaturant in alcohol in that it renders the alcohol nauseating and undrinkable, the alcotate nevertheless possesses disadvantages due to the ease with which it may be removed by dilution of the alcohol with water, filtration through active charcoal or other absorbents and similar means.

It has now been found that denaturants similar in respect to their nauseating action to alcotate and markedly superior in that they are much more difficult to remove from admixture with ethyl alcohol may be produced by a limited oxidation of alcotate itself, or of other organic liquids containing combined sulfur and obtained by neutralization or steam distillation of acid or caustic used for treating petroleum oils, and of other compounds which may be derived from such liquids. Amongst such compounds may be mentioned pure compounds such as mercaptans, thioethers, di-sulfides, thio-esters, and the like and also the complex mixtures as may be obtained from petroleum. For example, mixed mercaptans may be obtained by steam distillation of caustic soda used for treating light cracked naphthas and mixtures of di-sulfides or thio-ethers may be prepared from these mercaptans by limited dehydrogenation or by removal of hydrogen sulfide respectively.

In this method for preparing improved denaturants any suitable organic sulfur-containing liquid as described above is subjected to a limited oxidation under conditions at which thermal decomposition is substantially inappreciable and the oily product is redistilled to meet the required Government specification for denaturants or any other distillation specifications, as may be desired. As an example of the operation of this process the following is given:

An organic liquid produced by the steam distillation of acid sludge from the treatment of a cracked petroleum oil from a West Texas crude is redistilled and the fraction boiling between 110 and 200° C., with a density of 33.5° A. P. I. and a sulfur content of 13%, is collected separately. This fraction is subjected to a temperature of 170° C. at approximately 1500 pounds per square inch in admixture with air containing approximately an equi-molal quantity of oxygen per mol. of organic liquid for a period of about 2 hours. The pressure drops slightly as the reaction proceeds and the reaction is substantially complete at the end of this time as evidenced by no further decrease in pressure of the bomb. The product is cooled and withdrawn with release of pressure and a volume of organic liquid is secured equal to 90% of the initial fraction used. This product is redistilled and the fraction boiling between 104 and 210° C. is collected with a yield of 80% based on the initial fraction. This fraction shows a gravity of 33.8° A. P. I. and a sulfur content of 12.8%, and possesses satisfactory nauseating qualities when admixed with alcohol.

This denaturant is more soluble in alcohol-water mixture than are other accepted denaturants; for example, at least 14.4 cc. of water are required to produce a turbidity in a 25 cc. sample of alcohol containing 1.5% of the oxidized product. This is to be compared with the standard turbidity test for denaturants of the alcotate type which require only 8.0 cc. of water to produce the same turbidity. The improved denaturant is also superior in that it cannot be as completely precipitated from alcohol by the addition of even much larger amounts of water, and a substantial amount remains even after filtration through active charcoal.

Other gaseous mixtures such as free oxygen or oxygen-nitrogen mixtures containing other concentrations of oxygen than that in air and steam or other diluents than nitrogen, may be used in the oxidation process. Indeed other oxidizing agents such as hydrogen peroxide, chromates, permanganates and the like may be used in place of free oxygen, though with the latter it is preferable to employ stirring to insure satisfactory contact and to diminish local over-oxidation or excessive gas formation. While satisfactory results are obtained by using approximately equi-molal quantities of reactive oxygen and organic liquid the proportion of oxygen may be varied widely. Smaller amounts of oxygen have less effect in improving the quality of the denaturant and too great an excess of oxygen is objectionable because of the extensive oxidation resulting with the formation of gaseous products and the desulfurization of the liquid. In general the molal ratio of oxygen to organic liquid is preferably between about 0.25 and 3.0. The temperature of the oxidation may vary between wide limits according to the nature of the oxidizing agent used, and with air it should be above the threshold temperature at which reaction occurs, namely about 140 to 150° C.; with all agents the maximum temperature should be below such temperatures as cause appreciable thermal decomposition under the operating conditions used and with air it should be not more than about 550° C. and preferably below 400° C. The pressure may vary from atmospheric or below to very high pressures of 1500 to 3000 pounds per square inch or higher and it is generally preferred that the relation of temperature and pressure be such that the organic liquid is substantially in liquid phase during the process. The time of reaction will be controlled according to the amount of oxygen used and the type of product secured as will be understood and is generally immaterial where less than an excess of oxygen is employed. The oxidation may be conducted over metallic heat conducting or refractory surfaces.

The boiling range of the material subjected to our limited oxidation process is primarily dependent on the desired boiling range and density of the finished denaturant, and may vary widely without materially affecting the denaturant qualities of the product. Stocks of proper boiling range, density, and sulfur content may be selected so as to provide denaturants meeting any predescribed specification, as will be understood. In general it is preferable to select a stock having a sulfur content above about 4 or 5%, and the sulfur may be as high as 10 or 20% or even higher.

The improved denaturant may be used alone as a satisfactory denaturant for ethyl alcohol, or it may be mixed with other substances such as non-potable alcohols, esters, denaturants of the alcotate types, petroleum hydrocarbons and the like, which may act merely as diluents, or may impart additional denaturant qualities.

Our improved product is also particularly useful as a gas odorant; for example, less than 1000 cc. of our product are required to impart an appreciable odor to one million cubic feet of a substantially odorless natural gas, or of a mixture of air with 20% propane, while under the same conditions more than 4000 cc. of ordinary odorants obtained from acid sludge from treating petroleum oils are required.

Our invention is not to be limited by any theory of the mechanism of the reactions nor to any specific example which may have been given for purposes of illustration, but only by the following claims in which we wish to claim all novelty inherent in the invention.

We claim:

1. An improved liquid organic denaturant comprising a product of oxidation of an oil containing about 4 to 20% of combined sulfur and obtained by hydrolysis and distillation of sulfuric acid sludge from treating petroleum oils.

2. An improved liquid organic denaturant comprising a product of oxidation of a liquid fraction containing about 4 to 20% of combined sulfur and boiling between 110 and 200° C. and obtained by steam distillation of sulfuric acid sludge from treating petroleum oils.

3. A liquid organic denaturant comprising a product of oxidation of an organic liquid containing more than 4% combined sulfur and derived from petroleum oils produced by treating the organic liquid with gases containing oxygen at temperatures of 170° to 550° C.

4. A liquid organic denaturant comprising a liquid product of oxidation of organic liquid containing sulfur and derived from petroleum oils produced by oxidation of said liquid with an equi-molal quantity of oxygen at a suitable reaction temperature insufficient to cause appreciable thermal decomposition.

5. A liquid organic denaturant comprising a product of oxidation of organic liquid containing sulfur and derived from petroleum oils produced by oxidation of said liquid with an equi-molal quantity of oxygen in air at a suitable reaction temperature insufficient to cause appreciable thermal decomposition and at a pressure sufficient to maintain the liquid substantially in liquid phase.

6. A product according to claim 10 in which the oxidation is conducted at 170° C. and 1500 pounds per square inch pressure.

7. A process for producing odorants especially adapted to be used as denaturants, comprising partially oxidizing an organic liquid containing about 4 to 20% of sulfur in the form of organic sulfur compounds derived from petroleum oils.

8. Process according to claim 7 in which the oxidation is carried far enough to appreciably increase the solubility of the organic sulfur compounds in an alcohol-water mixture but not far enough to desulfurize said compounds.

9. An improved process for producing denaturants from petroleum hydrocarbons, comprising treating said hydrocarbons with sulfuric acid, steam distilling the sulfuric acid layer resulting from such treatment to obtain a petroleum oil containing about 4 to 20% of combined sulfur and then partially oxidizing the product of said steam distillation.

10. An improved process for producing denaturants from petroleum hydrocarbons, comprising treating said hydrocarbons with sulfuric acid to produce sludge containing over 4% of sulfur in the form of organic sulfur compounds and treating said sludge to produce partially oxidized organic sulfur compounds therefrom.

11. A new composition of matter comprising a solution containing chiefly ethyl alcohol and a small amount of a miscible hydrocarbon product containing combined sulfur and produced by the limited oxidation of liquid organic material containing about 4 to 20% of combined sulfur and derived from petroleum.

12. A liquid composition for use as a denaturant comprising a mixture of liquid organic sulfur compounds having different boiling points produced by the limited oxidation of complex mixtures of organic sulfur compounds containing about 4 to 20% of combined sulfur and derived from petroleum, including mercaptans, thio ethers and disulfides.

13. An improved liquid organic denaturant comprising a product of oxidation of organic liquids containing about 4 to 20% of combined sulfur and obtained by steam distillation of sulfuric acid sludge from treating cracked petroleum oils.

14. An improved liquid odorant especially adapted to be used as a denaturant, comprising a product of oxidation, containing organic sulfur compounds, of liquid organic material containing about 4 to 20% of sulfur in organic sulfur compounds and derived from petroleum.

PER K. FROLICH.
F. LAVERNE MILLER.